March 15, 1955   M. H. RIPLEY   2,704,109
AUTOMOBILE BED APPARATUS
Filed Feb. 6, 1953   2 Sheets-Sheet 1
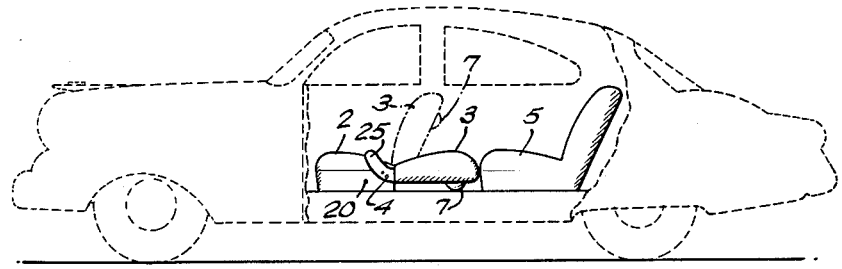
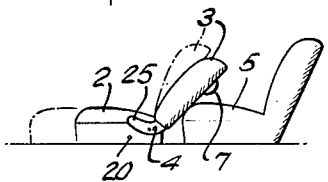
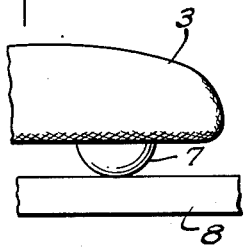
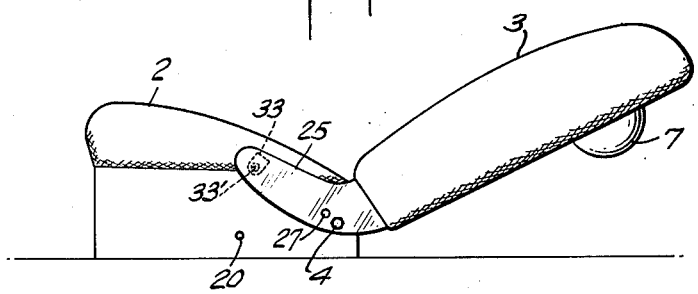
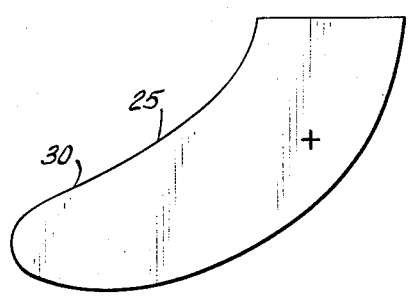
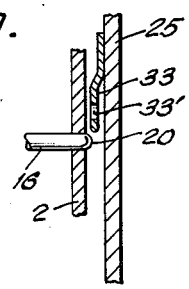
INVENTOR:
MILLARD H. RIPLEY
BY
Robert V. Morse
ATTORNEY.

March 15, 1955
M. H. RIPLEY
2,704,109
AUTOMOBILE BED APPARATUS
Filed Feb. 6, 1953
2 Sheets-Sheet 2
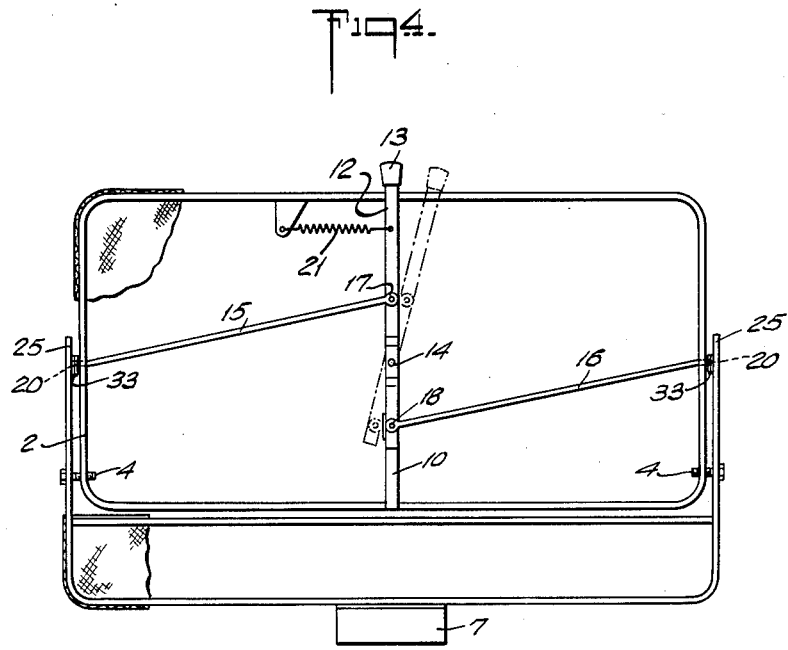
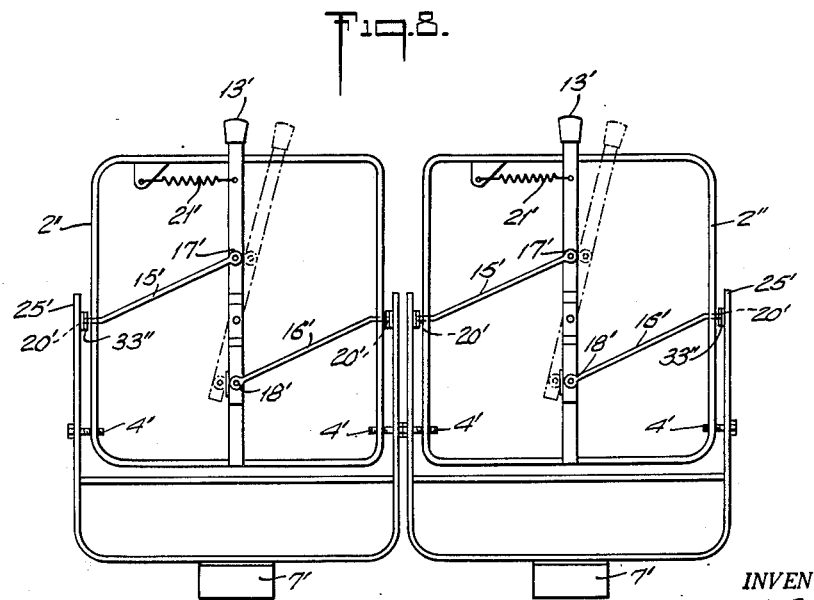
INVENTOR:
MILLARD H. RIPLEY
BY
Robert V. Morse
ATTORNEY.

United States Patent Office 2,704,109
Patented Mar. 15, 1955

2,704,109

AUTOMOBILE BED APPARATUS

Millard H. Ripley, Ithaca, N. Y.

Application February 6, 1953, Serial No. 335,530

1 Claim. (Cl. 155—7)

This invention relates to automobile beds and has for its principal purpose the provision of an inexpensive apparatus by which a standard four door sedan can be readily converted into a reclining chair or bed model at a minimum cost, using only the tools and skill available at a dealer's service station. Numerous attempts have been made in the past to provide a means for dropping the back of a front seat in a four door sedan so as to make a bed consisting of the cushion of the front seat, the lowered back of the front seat, and the rear seat cushion. However, they have involved such expense in modifying a standard car that few have attempted them.

The apparatus of the present invention makes possible the conversion at a reasonable cost and is applicable to any standard car having a front seat built on a frame separate from the car walls and having its back held by toe and ankle bolts to the front seat frame structure. When in use with the front seat moved forward it converts the sedan into a comfortable bed; and with the front seat moved backward it provides a reclining chair. By using separate controls it can also be applied to models with divided front seats so that one passenger can either recline in a chair or sleep as in a bed while the other drives.

The device takes advantage of the toe-bolt hole used in the foot of the brace of the seat back in such cars to provide for the locking rods of the apparatus, thus reducing the expense of installation and insuring that the seat back when up is at precisely the standard position. As there are only a few makes of cars and they are highly standardized, it is important that any conversion apparatus be applicable to such standard structure without cutting or weakening it; for unless it is applicable to the standard structure of mass production the general public will be unable to use it. The average car owner cannot afford to rebuild his car to any considerable extent. The present device can be installed by only drilling a few small holes with an ordinary electric hand drill. There are no visible changes in the car that could be noticed by the average person except the control lever, so that it gives every appearance of a factory designed installation. Yet it can be applied to old cars as well as new at slight expense.

Referring now to the drawings forming part of this specification,

Fig. 1 is a side sectional view of a car in outline form showing the back of the front seat let down to a bed position, with the normal driving position indicated in broken lines.

Fig. 2 is a similar view with the front seat back moved into the position of a reclining chair.

Fig. 3 is a detail view of the ash tray used as a support.

Fig. 4 is a plan view of the control mechanism as viewed from the under side of the seat, showing the operating levers and the connections to the back of the seat.

Fig. 5 is a side elevation view of the brace at the foot of the back of the front seat showing the toe bolt removed and the hinge bolt inserted at the ankle of the brace.

Fig. 6 is a detail view of the template for locating the hinge bolt.

Fig. 7 is a detail view partly in cross-section showing the locking catch and the beveled tip of the control rod which allows it to snap automatically into locking position in the foot of the seat brace when the seat back is lifted to normal driving position.

Fig. 8 is a plan view similar to Fig. 4 but showing the control mechanism applied to divided front seats.

Similar reference numerals refer to similar parts thruout the various views.

Referring first to the general views shown in Fig. 1 and Fig. 2, the car 1 having a movable front seat 2 and a tilting back 3 for said seat, pivoted at 4, can be arranged as a bed by dropping the back to a horizontal position as shown in Fig. 1, so that the back combines with the front seat 2 and the rear seat 5 to provide a bed. In such event the back of the front seat must be supported about level with the rear seat. Instead of using special supports as in the past, the ash tray 7 mounted in the back of the front seat can serve as a support and hold the cushion 3 substantially horizontal in cars where the center of the floor 8 is raised as in some models. This not only saves extra parts and expense but also assists in maintaining the car as apparently standard in appearance for ordinary use. This ash tray is shown more in detail on a larger scale in Fig. 3. When not in use as a support it can be used as an ash tray in the usual manner.

The construction can not only be used for ordinary driving with the front seat in normal position and for a bed, but also may be utilized to provide a reclining seat for occasional rest as shown in Fig. 2. When divided front seats are used one passenger can recline while the other drives. With an undivided front seat both may recline in a comfortable position when not moving, such as when watching outdoor movies or games. This is accomplished by moving the front seat back—instead of in the forward position used for a bed—and the back of the front seat when released falls back until it contacts the seat cushion of the rear seat which then holds it in a comfortable position.

The mechanism by which the back of the front seat is locked in a normal driving position and unlocked at will to swing back to either the bed or reclining position is shown in Fig. 4 which shows it as viewed from the bottom, as when the seat is removed for installation and turned upside down. It consists of a particular construction which takes advantage of the present standard seat structures to reduce the cost to a small fraction of that previously required.

Referring now to Fig. 4, the under side of the seat 2 has bolted thereto a fixed cross-bar 10 which supports the operating mechanism to be described. The operating lever 12 having a handle or knob 13 is pivoted at 14 to the supporting bar 10. Locking rods 15 and 16 are pivotally mounted at 17 and 18 respectively on the lever 12, so that when the operating lever 12 is moved to one side as shown the tips 20 of the rods 15—16, which otherwise protrude beyond the sides of the seat 2, are withdrawn within the sides of said seat. When the operating lever 12 is released and drawn to the left by the tension of the spring 21, the tips 20 of the rods 15—16 then protrude beyond the walls of the seat 2 and serve to lock the back 3 of the seat in its normal driving position.

The types of cars to which this device is particularly adapted have removable front seats 2 constructed with a back 3 having, at the bottom or foot, braces 25 firmly secured to the sides of the seat by bolts, the bolts near the tip of said foot brace being called toe bolts and the others near the bend of the brace being called the ankle bolts, since the brace 25 somewhat resembles a foot and extends forward from the lower part of the seat back. However, it is impossible to swing the back down even if the toe bolt is removed, since the ankle bolt is located for permanent rigid position. The location of the pivot point must be at a proper center and therefore there is provided with the present apparatus a template 30 as shown in Fig. 6 which when placed on the foot brace 25 indicates by the X mark precisely where to drill and tap, so that the average mechanic cannot go wrong on this critical point. It is sufficiently to the rear to make the back clear the front seat cushion when it swings down. This is the only operation of any precision required in the installation, since the toe bolts are removed and their holes 33' used without drilling for the tips 20 of the locking rods 15—16.

To install the apparatus the ankles of the braces 25 are drilled and tapped as described, using the template 30, with the toe bolts still in and the seat in its normal position, the drill also going on thru the side walls of the seat frame base 2 near its corners, which are then tapped for the pivot bolts 4. These are not at the locations 27 of the former ankle bolts, which have been removed. The toe bolts are then removed and the seat back 3 is free to swing down to a horizontal position.

To lock the seat back 3 in the normal vertical position for driving, the tips 20 of the rods 15—16 project into the holes 33' formerly occupied by the toe bolts and hold the back 3 securely in place. To lower the back the operator moves the handle 13 and lever 12 to one side, thus withdrawing the rods 15—16 from the holes 33' and allowing the back 3 to fall.

When the back is to be returned to its former position it is merely lifted up and an automatic locking mechanism secures it as shown in detail in Fig. 7. In Fig. 7 there is shown the lower side wall of the seat 2 having the hole 33' formerly occupied by the toe bolt as described, thru which protrudes the tip 20 of a rod 15 for example (or 16 on the other side). The tip 20 is beveled or rounded and can be engaged by the socket lug 33 on the toe part of the foot brace 25 which holds the back. As the back 3 is raised this lug 33 engages the rounded tip 20 of the rod 15 and forces it back against the tension of the spring 21 (see Fig. 4). The hole 33' in the lug 33 then moves into alignment with the rod 15 which snaps back into the hole 33' thus locking the back 3 in place. The back cannot be released until the operating lever 12 is again moved by the handle 13.

When the car has a single wide front seat the apparatus such as shown in Fig. 4 is used with the lever 12 operating the catches on both sides. But when the car has divided front seats, that is, two separate front seats, a somewhat similar apparatus may be used as shown in Fig. 8, whereby each person can control his own seat inclination, and one drive while the other rests.

Referring now to Fig. 8, which is a view from below and in which the two sides are similar, the seats 2" have backs which are pivoted at 4' and provided with ash trays 7' which may be used as supports as described. Movement of the individual control levers 13' to the position shown in broken lines serves to withdraw the tips 20' from the locking holes 33" in the footbraces 25' so that the back of the seat can be dropped. The locking tips 20' are on the ends of the rods 15' and 16', pivoted to the control lever at 17' and 18' respectively, which operates against the tension of the spring 21'. When the back of the seat is lifted again the tips 20' snap back into place in the holes 33" and hold it securely. The installation is made in substantially the same manner as described in connection with Fig. 4, Fig. 5, Fig. 6 and Fig. 7.

I claim:

Means for converting a standard sedan into a sleeping bed car comprising in combination a support attached to the under side of the front seat of the car, said seat having a base frame and a pivoted back, said seat back having foot shaped lower braces at the sides of the base frame of the seat, each of said braces having a socket lug on the inside of its toe portion facing the base frame, said lug having a locking hole, each of said foot shaped braces also having a pivot hole in its ankle portion, pivot bolts thru the pivot holes of the ankle portion of the lower back holding braces and base frame of the seat located sufficiently to the rear so that the back of the front seat can swing down to a horizontal position around the rear of the front seat cushion, an ash tray protruding from the back of the front seat to serve as a support for the back when said back is dropped to the horizontal position around the rear of the front seat cushion, an operating lever having a pivot attached to the support under the seat, a handle on said lever, a locking rod attached to said lever at one side of said pivot, a second locking rod attached to said lever on the other side of said pivot, said rods extending to opposite sides of the seat and protruding thru the base frame to engage and lock the lower braces of the front seat, a spring attached to the rod and lever system to normally hold the rods in the locking position and to return the operating lever handle to said position after it has been moved to the unlocking position, each of said rods having a beveled tip whereby they are forced inward by the socket lugs on the inside of the foot braces when the seat is raised and then snap out to automatically lock it to put the seat back into the driving position.

References Cited in the file of this patent

UNITED STATES PATENTS

| | | |
|---|---|---|
| 1,702,284 | Thien et al. | Feb. 19, 1929 |
| 2,094,410 | Redding | Sept. 28, 1937 |
| 2,543,167 | Hening et al. | Feb. 27, 1951 |
| 2,622,659 | Stelmack | Dec. 23, 1952 |